March 28, 1950   R. CHELBORG   2,501,711
MECHANIZED HAND CUTTING BLOWPIPE
Filed Feb. 4, 1948   2 Sheets-Sheet 2
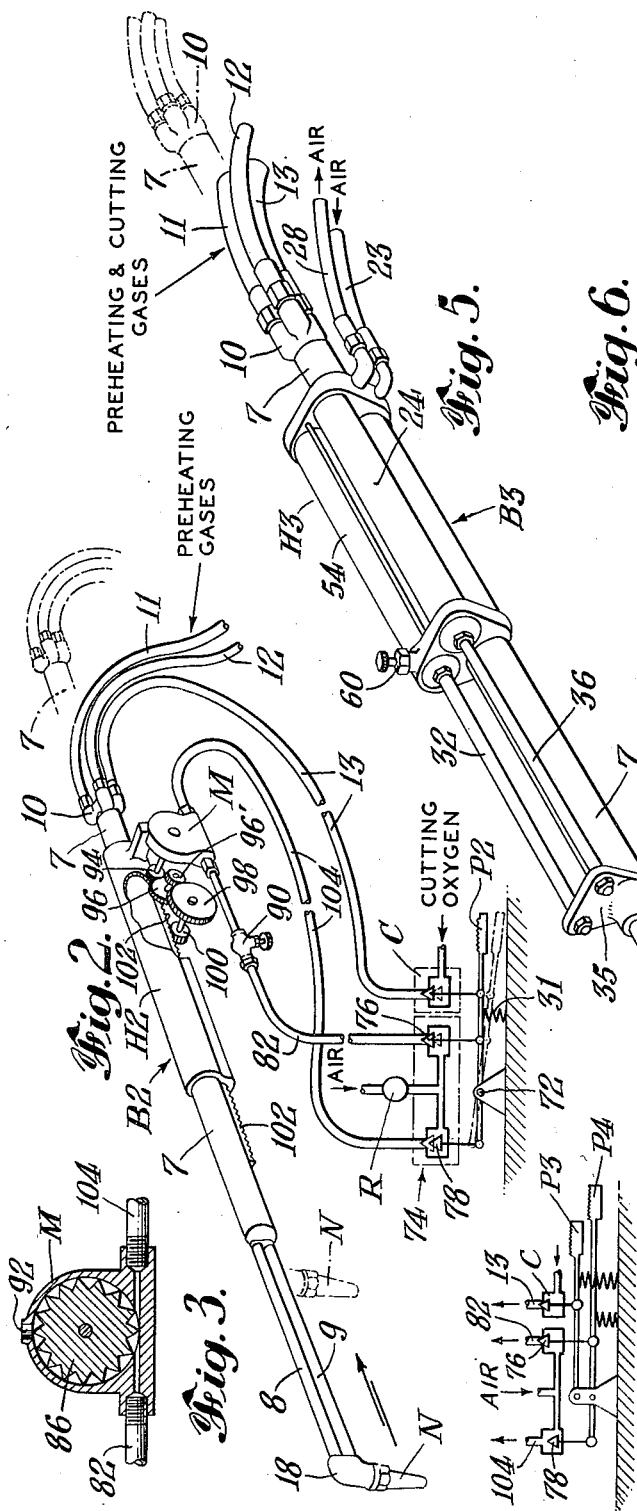
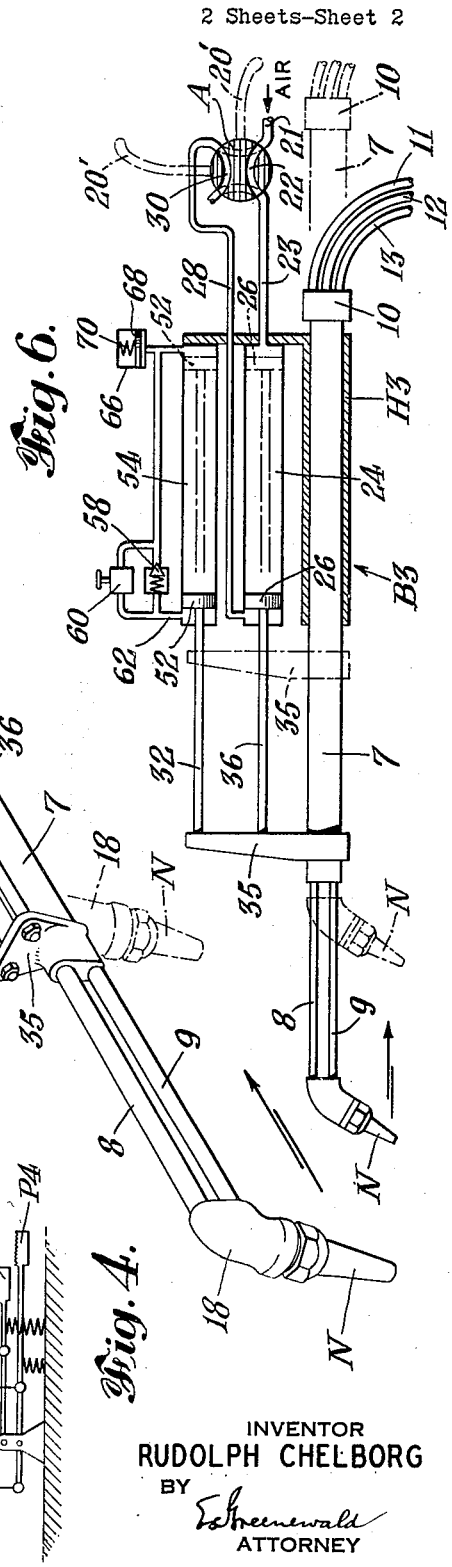
INVENTOR
RUDOLPH CHELBORG
BY
ATTORNEY Patented Mar. 28, 1950

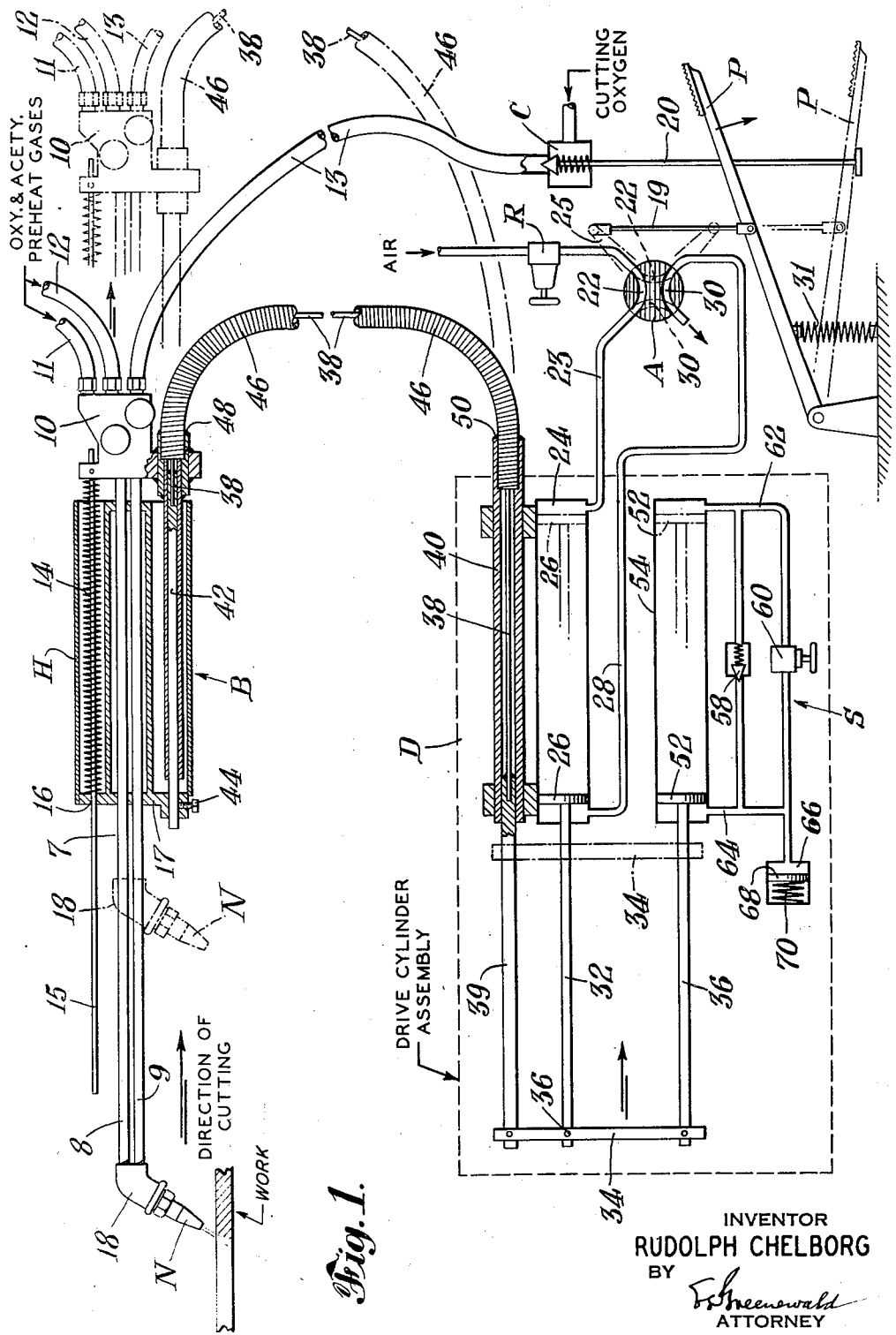

2,501,711

UNITED STATES PATENT OFFICE 2,501,711

MECHANIZED HAND CUTTING BLOWPIPE

Rudolph Chelborg, Maplewood, N. J., assignor to The Linde Air Products Company, a corporation of Ohio Application February 4, 1948, Serial No. 6,178

13 Claims. (Cl. 266—23)

This invention relates to torches or blowpipes, and more particularly to hand cutting blowpipes which are partly mechanized.

In manipulating an oxygen cutting blowpipe, skill on the part of the operator is necessary to make cuts which are satisfactory, due to the necessity of expertly moving the cutting nozzle at a relatively constant speed, which depends upon the thickness of the work being cut, while maintaining the nozzle properly spaced from the work, and keeping the axis of the cutting oxygen stream at the proper angle during the kerf forming progress of the nozzle.

Machine cutting blowpipes have been perfected, but they are not at all suitable for cutting irregular work in hard-to-get-at locations, such as risers on large ferrous metal castings, for example. For cutting off risers on large castings, it is necessary to use a hand cutting blowpipe. Conventional manipulation of a hand cutting blowpipe is not only tiring to the operator, but he must be trained in this type of work.

Hence, there exists a need for a hand cutting blowpipe which is at least partly mechanized and constructed so that it can be properly manipulated by even an unskilled operator.

The main object of this invention is to provide a mechanized hand cutting blowpipe, which fills such need, so that with it unskilled as well as skilled operators can easily make smooth cuts which do not require any subsequent machining of the work.

According to the invention there is provided a novel blowpipe comprising a blowpipe handle which is elongated, and a blowpipe body which is also elongated, adapted to slide axially of and in such handle, so that movement of the body and with it the blowpipe nozzle, is guided by the handle during the working stroke of the blowpipe nozzle, and means for producing uniform motion of the blowpipe body relatively to the handle, whereby it is only necessary for the operator to hold the blowpipe steady by simply gripping the handle during such working stroke of the nozzle. This makes it possible for an inexperienced operator to make a smooth, straight cut, comparable to a machine cut.

The blowpipe body is connected to a power drive and equipped with suitable controls, so that the operator can hold the handle with his hands and operate the controls with his foot, if desired, to drive the blowpipe in forward or reverse directions at will. It enables an inexperienced operator to produce straight and relatively waverless cuts with a hand blowpipe. It has the advantage of being extremely portable, permitting machine type cuts that would be impossible in many cases with any standard cutting machine. For this reason, it is especially useful in foundries for removing risers that are encountered in many different positions on castings.

This is the primary purpose for which the invention was intended, but it will naturally be applicable to a great many classes of work, such as ship scrapping, fitting structural members in place on the job, and cutting gussets and other small members from a plate in a fabricating shop, for example.

In the drawings:

Fig. 1 is a view mainly in side elevation of a mechanized hand cutting blowpipe system illustrating the invention;

Fig. 2 is a view mainly in perspective of a modification;

Fig. 3 is an enlarged sectional view of the air turbine employed in the modification shown in Fig. 2;

Fig. 4 is a view in side elevation of a two-pedal modification of the remote control;

Fig. 5 is a perspective view of another modification of the invention; and

Fig. 6 is a diagrammatic view mainly in side elevation illustrating the operation of the modification of Fig. 5.

As shown in Fig. 1 a mechanized hand cutting blowpipe B is provided which includes an elongated tubular handle H and an elongated body 7 which is mounted for longitudinal sliding movement in and axially of such handle. The blowpipe body 7 per se may be of conventional construction, such as that shown, which comprises parallel pipes 8 and 9, well known to those skilled in the art, except for the handle and the cutting oxygen valve. The body 7 includes a valve block 10 provided with suitable valved passages for mixing the oxygen and acetylene or other preheating gases which are supplied thereto by suitable hoses 11 and 12. Cutting oxygen is supplied to the blowpipe through a hose 13.

The body 7 is urged backwardly in the handle H by a compression spring 14 located on a guide rod 15 which is fastened near one end to the block 10 and extends parallel to the pipes 8 and 9, through an eye 16 in a front panel 17 of the handle. The maximum extent of movement of the body 7 in either direction with respect to the handle H is limited by the length of the cylinder 24, but suitable stops may, if desired, be provided on the handle H for this purpose.

The blowpipe body is provided with an angular head 18 to which is attached a cutting nozzle N having the usual central cutting oxygen discharge passage surrounded by an annularly arranged group of preheating gas discharge orifices, the use of which is well known to those skilled in the art.

A remotely located pedal or foot-operated lever P is attached to a four-way valve A by a link 19 through a crank 25, and to a cutting oxygen valve C by a stem 20 so that, when the lever P is at the illustrated full line position, the cutting oxygen valve C is closed, and compressed air from a regulator R flows through the four-way valve A via passage 22 and conduit 23 to an air cylinder 24 of a drive cylinder assembly D, pushing against a piston 26 therein, and forcing it from a retracted position (shown in dotted outline) to an extended position (shown in full lines), causing air in the cylinder on the other side of the piston to exhaust from the four-way valve A via passages 28 and 30. The lever P is urged toward such position by a spring 31.

Piston 26 is connected by a rod 32 to a bar 34 at 36 so that the extension of the piston 26 also effects forward movement of a flexible cable 38, which is connected to bar 34 by a guide rod 39. The rod 39 slides in a tube 40 which is mounted on the cylinder 24 in parallel relation thereto. A similar rod 42 is connected to the other end of cable 38 and to the blowpipe handle H at 44. Cable enclosure 46, which is fixed to the blowpipe body 7 at 48, and to the tube 40 at 50, thus moves over cable 38 in a direction opposite to the direction of tension of the cable, bringing the blowpipe body 7 to the extended position (shown in full lines) where it is set to start to cut. Handle H remains stationary during the cutting operation. The speed of the body 7 during the cutting stroke of the nozzle N is controlled by suitable adjustable means such as the illustrated hydraulic system S.

Such hydraulic system includes a piston 52 connected to bar 34 through a rod 36 for movement in unison with air piston 26; the piston 52 moving to its dotted line position when the foot lever P is moved to the dotted line position. In so doing hydraulic fluid ahead of the moving piston 52 is forced from cylinder 54 into a passage 62 exerting pressure against a check valve 58, causing it to close; and flowing through an adjustable cutting speed control valve 60 and returning to the hydraulic cylinder 54 via passage 64.

With the blowpipe body 7 in the extended position (shown in full lines), and the preheating flames adjusted to neutral, the foot lever P is depressed to the cutting oxygen "on" position (shown in dotted lines), initiating travel of the blowpipe body 7 along the line of cut. This is effected as gas passages 22 and 30 in four-way valve A are turned 90 degrees by link 19, to new positions (shown in dotted outline) which conducts compressed air from regulator R to passage 22 into conduit 28 and then to air cylinder 24. Entering cylinder 24 the compressed air exerts pressure against air piston 26, forcing it to the dotted line position, and causing air to exhaust from the system through passage 23 in the four-way valve A. When this occurs, the action of piston 26, which is connected to bar 34, effects a compressing action on cable 38, so that as piston 26 retracts, the blowpipe body 7, to which the cable enclosure 46 is affixed at 48, also retracts along the line of cut bringing the body 7 to the retracted position, as shown in dotted lines.

During the cutting action, the hydraulic cylinder piston 52, being connected to bar 34, also retracts, forcing hydraulic fluid from the cylinder 54 via passage 62, forcing check valve 58 to close, and returning fluid to the opposite side of piston 52 in the hydraulic cylinder 54 through conduit 64, valve 60 and conduit 62. The adjustment of valve 60 regulates the cutting speed. A reservoir 66 containing hydraulic fluid, and a piston 68 loaded by a spring 70, communicates with the conduit 64 for the purpose of compensating any variation in the volume of hydraulic fluid in the system, caused, for example, by the reciprocating movement of piston rod 36 in the hydraulic cylinder 54 as the blowpipe body is extended and retracted.

The operator supports his arm on a suitable arm rest not shown, and holding the blowpipe B steady by gripping the handle H, manipulates the foot lever P which initiates flow of the cutting oxygen and effects movement of the blowpipe nozzle N along the proposed line of cut.

The blowpipe handle is held steady or tilted according to the shape of the work by the operator during the subsequent cutting operation.

In the modification shown in Figs. 2 and 3, the blowpipe body 7 is driven by an air motor M which is mounted on the handle H. The operator grips the handle H2 to hold the blowpipe B2 steady, and after preheating the work, steps on the foot lever P2 which is mounted to pivot on a fulcrum 72. This operates a three-way valve system 74, and depressing the lever P2 causes cutting oxygen valve C to open, air valve 76 to open and air valve 78 to close, and compresses the lever-return spring 31. The blowpipe body 7 initially is in the retracted position 7 (shown in dotted outline). When the foot lever P2 is depressed, compressed air from the air supply which includes the adjustable pressure regulator R, flows into air hose 82 which conducts it to the air motor or turbine M. The turbine rotor 86 is thus caused to rotate in a counter-clockwise direction, Fig. 3, the turbine speed being controlled by an adjustable control valve 90, the spent air exhausting from the air turbine through a vent.

The rotor of the turbine is provided with a pinion 94 which engages a gear 96, rotating gear 96, Fig. 2, in a clockwise direction. The gear 96' engages a gear 98 effecting counter-clockwise motion of a pinion 100 which engages rack 102, causing the blowpipe body 7 to slide forward at a preset speed in the handle H2 to the extended position (shown in full lines), the cut being effected during the travel of the nozzle N across the work.

After the cut is made, relaxing pressure on the foot lever P2 unloads return spring 31, and its restoring force returns the foot lever to its normal "off" or retracted position. In this movement air valve 78 opens, air valve 76 closes, and cutting oxygen valve C closes. Consequently, the direction of the turbine motivating air is reversed and the compressed air flows into turbine M through an air hose 104 and again is expelled through vent 92. This causes a clockwise rotation of the turbine pinion 94 which in turn drives gear 96 in a counterclockwise direction which results in a clockwise rotation of gear 98 and pinion 100, resulting in the retraction of the blowpipe body 7 in handle H2 through the action of pinion 100 on rack 102.

The preheating gases supplied to the blowpipe

B2 are not affected by the above valving arrangement.

An alternative pedal arrangement is shown in Fig. 4 in which two pedals P3 and P4 are provided to make the cutting oxygen foot control independent of the air turbine foot control. With the one-pedal arrangement, cutting is only possible in one direction because the cutting oxygen is turned off when the single pedal is released. Using the two-pedal arrangement it is possible, however, to use the blowpipe B2 as an ordinary hand cutting blowpipe in pierce-and-cut operations, etc., by depressing the cutting oxygen foot pedal P3 only. It is also possible to cut in either direction of movement of the blowpipe body. For example, to cut in a backward or retracting direction thereof, i. e., with the nozzle N traveling along the kerf and toward the operator, the turbine control pedal P4 is depressed to first move the nozzle to the extended position and then simultaneously releasing pedal P4 and stepping on the cutting oxygen control P3 pedal, after preheating the work for the required length of time.

Fig. 2 shows the gear train and pinion gears exposed to view. This was purposely done for clarity. The gears are enclosed in a suitable housing (not shown) in order to protect both gear mechanism and the operator.

The gear reduction can be of any ratio and will depend on thicknesses to be cut, since thicker sections require more cutting time, and hence, slower blowpipe travel. If higher gear reduction is necessary, a patented arrangement is available as illustrated and described in Patent 2,336,581 of L. W. Young.

Instead of an entirely pneumatic system, an alternative hydraulic-pneumatic system may be used for extension and retraction of the blowpipe body 7 and nozzle N of a blowpipe B3 as illustrated in Figs. 5 and 6. Here, a four-way valve A and a crank 20' in combination with air and hydraulic cylinders 24 and 54 effect the movement or travel of nozzle N and blowpipe 7 along the line of cut.

In operation, with the blowpipe body 7 in retracted position, air is conducted into and through four-way valve A via passages 21, 22 and 23, and then into one end of air cylinder 24 wherein the air exerts force against the piston 26 causing it to move forwardly in cylinder 24. Piston 26 is rigidly fastened to the blowpipe body 7 by the rod 36 and a bracket 35, so that forward travel of the blowpipe body 7 to extended position is effected by the forward stroke of piston 26. Bracket 35 is also attached to piston 52 of the hydraulic cylinder 54 so that by suitable adjustment of the cutting speed control valve 60, the rate of travel of the blowpipe nozzle N can be controlled, the speed being proportional to the degree of valve opening.

The air in cylinder 24 ahead of the moving piston 26 is forced into conduit 28 which finally exhausts out through the four-way valve passage 30. The fluid in hydraulic cylinder 54 ahead of moving piston 52 is forced out of cylinder 54 exerting force against check valve 58 closing this valve and flowing through speed control valve 60 into conduit 64 and again into cylinder 54.

When retraction of the blowpipe nozzle N is desired, crank 20' is moved through a 90 degree arc, which reverses the route of air passage through four-way valve A, so that air supplied through inlet passage 21 flows directly to conduit 28 via passage 30 shown by dotted lines, and then into the other end of air cylinder where, exerting force on piston 26, it effects return of piston 26 to its original position and in consequence returns the blowpipe body 7 to the retracted position. The air behind piston 26 now flows into conduit 23 and exhausts through four-way valve A via passage 22, also shown by dotted lines.

In the hydraulic system, piston 52, which acts in unison with piston 26 due to the connection through rods 32 and 36 and bracket 35, returns to the initial retracted position and the hydraulic fluid is forced out of one end of cylinder 54 into conduit 64. Pressure of this fluid effects opening of check valve 58, and the fluid flows through the valve and through speed control valve 60 into the forward end of hydraulic cylinder 54 via conduit 62, effecting a relatively quick return of the nozzle N.

The reservoir 66 containing hydraulic fluid is included in the hydraulic system. It contains the piston 68 and compression spring 70. This device serves to compensate for any change in volume of hydraulic fluid, such as that resulting from the movement of the piston rod in and out of its cylinder.

With this system cutting oxygen is of course independent of the blowpipe drive, and therefore the blowpipe can be used either as an ordinary hand cutting blowpipe, or as the mechanized type where the nozzle travels automatically along the line of cut, but the operator merely steadies the blowpipe by gripping the handle or holder H3.

It is also possible, according to the invention, to effect a drive for such a mechanized blowpipe by the use of an electric motor, ratcheting or inching means, remotely driven by flexible shaft or belting, or by by-passing some of the cutting oxygen to drive a cylinder, turbine, or positive displacement rotary device. Also the blowpipe body can be driven by a spring contained in the handle which can be wound up by hand or by a motor when required, the movement of the body being controlled by a suitable governor which is adjustable, without departing from the invention.

What is claimed is:

1. A mechanized hand cutting blowpipe device comprising the combination with an oxy-acetylene blowpipe provided with an elongated tubular handle and a blowpipe body which is also elongated and operatively associated with said handle so that the body can reciprocate longitudinally through and axially of the handle between fixed points, a valve block connected to one end of the body, an angular head connected to the other end of the body, an oxy-acetylene cutting nozzle mounted on said head, and hoses connected to said block for supplying cutting oxygen and preheating oxygen and acetylene to the blowpipe, of means operative when energized to drive said body through one stroke in a desired direction with respect to said handle, a cutting oxygen supply valve which controls the flow of cutting oxygen in the cutting oxygen supply hose, and remote control means for operating said cutting oxygen supply valve and said blowpipe body driving means, so that cutting oxygen is supplied to said nozzle when the blowpipe body driving means is energized to start the cutting stroke of the body and nozzle, and continues to be supplied during such stroke, whereby cutting is accomplished by simply gripping the blowpipe handle and operating the remote control means.

2. A mechanized hand cutting blowpipe device, as defined by claim 1, in which the blowpipe body driving means includes an air cylinder containing a piston which is connected to the body by a flexible cable, and a two-position four-way air valve which is connected through an adjustable pressure regulator to a suitable source of compressed air, so that when the valve is in one position compressed air is supplied to the cylinder on one side of the piston and exhausted from the opposite side, and when the valve is moved to the other position compressed air is supplied to the cylinder on the other side of the piston and exhausted from the opposite side.

3. A mechanized hand cutting blowpipe device, as defined by claim 2, in which the movement of the compressed air driven piston is regulated by a hydraulic governor comprising a hydraulic cylinder containing a piston which is connected to said compressed air driven piston, a conduit containing a check valve communicating with the hydraulic cylinder on opposite sides of the piston therein, an adjustable piston speed control valve connected in shunt with said check valve, and a reservoir containing a spring-loaded piston operative to compensate for any change in the volume of fluid in the hydraulic governor.

4. A mechanized hand cutting blowpipe device, as defined by claim 3, in which the remote control means includes a single pedal which is operatively connected to said four-way valve and also to said cutting oxygen supply valve.

5. A mechanized hand cutting blowpipe device comprising the combination with a cutting blowpipe comprising a blowpipe handle, and a blowpipe body mounted to reciprocate in said handle, of a reversible motor mounted on said handle, means connecting said motor to said body for driving the latter with respect to the handle when the motor is energized, and remote control means for energizing said motor to drive the blowpipe body in a desired direction.

6. A mechanized hand cutting blowpipe device, as defined by claim 5, in which the motor is a compressed air driven turbine.

7. A mechanized hand cutting blowpipe device, as defined by claim 6, in which the remote control means includes compressed air supply valve means and a pedal associated therewith for reversing the flow of compressed air supplied to said turbine.

8. A mechanized hand cutting blowpipe device, as defined by claim 7, in which a cutting oxygen supply line containing a valve is connected to said body, and means connecting such valve with the pedal so that cutting oxygen is supplied to the blowpipe during the cutting stroke of the blowpipe body when the pedal is depressed.

9. A mechanized hand cutting blowpipe device, as defined by claim 8, in which an adjustable throttle valve is provided in the compressed air supply line to the turbine for the purpose of governing the speed of the body during the cutting stroke thereof.

10. A mechanized hand blowpipe comprising the combination with an elongated body having a burner head on one end and a gas inlet block on the other end, gas supply lines connected to the block, a nozzle mounted on the head, a handle in which said body is adapted to slide, a pneumatic motor mounted on said handle, means connecting said motor to said body to drive said body, and means for controlling the supply of air to said motor.

11. A mechanized hand blowpipe, as defined by claim 10, in which an adjustable governor controls the speed of the body during the working stroke of the blowpipe body with respect to the handle.

12. A mechanized hand blowpipe, as defined by claim 11, in which the governor is mounted on the handle and comprises a hydraulic system comprising a cylinder containing a piston which is connected to move with the blowpipe body.

13. A mechanized hand blowpipe, as defined by claim 12, in which a pipe containing a check valve is in fluid communication with opposite ends of the cylinder, and another pipe containing an adjustable throttle valve is also in fluid communication with the opposite ends of the cylinder.

RUDOLPH CHELBORG.

REFERENCES CITED

The following references are of record in the file of this patent:

UNITED STATES PATENTS

| Number | Name | Date |
| --- | --- | --- |
| 331,691 | Duennisch | Dec. 1, 1885 |
| 897,676 | Thompson | Sept. 1, 1908 |
| 1,112,783 | Gabraith | Oct. 6, 1914 |
| 1,205,818 | Thomas | Nov. 21, 1916 |
| 1,487,043 | Youtsey et al. | Mar. 18, 1924 |
| 1,503,898 | Hott | Aug. 5, 1924 |
| 1,653,907 | Hilgerink | Dec. 27, 1927 |
| 1,704,641 | Weed | Mar. 5, 1929 |
| 1,835,723 | Salzer | Dec. 8, 1931 |
| 1,912,612 | Wills | June 6, 1933 |
| 2,102,040 | Slade | Dec. 14, 1937 |
| 2,298,755 | Diller | Oct. 13, 1942 |
| 2,350,779 | Lapkoff | June 6, 1944 |

FOREIGN PATENTS

| Number | Country | Date |
| --- | --- | --- |
| 14,319 of 1909 | Great Britain | Mar. 31, 1910 |
| 662,422 | Germany | July 13, 1938 |
| 556,043 | Great Britain | Sept. 17, 1943 |